US012065258B2

(12) United States Patent
Heeter et al.

(10) Patent No.: US 12,065,258 B2
(45) Date of Patent: Aug. 20, 2024

(54) MULTIPLE INTAKE DISTORTION ADAPTIVE FAN FOR GAS TURBINE ENGINE

(71) Applicants: Rolls-Royce North American Technologies Inc., Indianapolis, IN (US); Rolls-Royce Corporation, Indianapolis, IN (US)

(72) Inventors: Robert W. Heeter, Indianapolis, IN (US); Daniel E. Molnar, Jr., Indianapolis, IN (US); Kathryn A. Sontag, Indianapolis, IN (US); Michael G. Meyer, Indianapolis, IN (US)

(73) Assignees: Rolls-Royce North American Technologies Inc., Indianapolis, IN (US); Rolls-Royce Corporation, Indianapolis, IN (US)

(*) Notice: Subject to any disclaimer, the term of this patent is extended or adjusted under 35 U.S.C. 154(b) by 44 days.

(21) Appl. No.: 18/101,567

(22) Filed: Jan. 25, 2023

(65) Prior Publication Data
US 2024/0246688 A1    Jul. 25, 2024

(51) Int. Cl.
*B64D 33/02* (2006.01)

(52) U.S. Cl.
CPC ...... *B64D 33/02* (2013.01); *B64D 2033/0226* (2013.01); *B64D 2033/0286* (2013.01)

(58) Field of Classification Search
CPC ............ B64D 33/02; B64D 2033/0226; B64D 2033/0286
See application file for complete search history.

(56) References Cited

U.S. PATENT DOCUMENTS

| 4,655,413 | A | * | 4/1987 | Genssler | F02C 7/042 |
| | | | | | 137/15.1 |
| 7,637,455 | B2 | * | 12/2009 | Silkey | F02C 7/04 |
| | | | | | 244/53 B |
| 7,926,290 | B2 | | 4/2011 | Johnson | |
| 7,975,961 | B2 | | 7/2011 | Silkey et al. | |
| 10,704,418 | B2 | | 7/2020 | Ramakrishnan et al. | |
| 11,149,639 | B2 | | 10/2021 | Duge | |
| 2019/0138663 | A1 | | 5/2019 | Ferrar et al. | |

FOREIGN PATENT DOCUMENTS

| CN | 106441789 | 2/2017 |
| WO | 2020113110 | 6/2020 |

OTHER PUBLICATIONS

F. Aulehla, Intake Swirl—A Major Disturbance Parameter in Engine / Intake Compatibility, Military Aircraft Division, Munich.
Chris Wiegand et al., F-35 Air Vehicle Technology Overview, AIAA Aviation Forum, 2018 Aviation Technology, Integration, and Operations Conference, Atlanta, Georgia.

* cited by examiner

*Primary Examiner* — Richard G Davis
(74) *Attorney, Agent, or Firm* — Barnes & Thornburg LLP (57) ABSTRACT

An aircraft includes a duct system configured to receive a flow of air therethrough and a gas turbine engine. The duct system includes a main duct and inlet ducts arranged fluidly upstream of the main duct so as to conduct the flow of air from the inlet ducts into the main duct. The gas turbine engine in downstream fluid communication with the main duct.

20 Claims, 7 Drawing Sheets

MULTIPLE INTAKE DISTORTION ADAPTIVE FAN FOR GAS TURBINE ENGINE

STATEMENT REGARDING FEDERALLY SPONSORED RESEARCH OR DEVELOPMENT

Embodiments of the present disclosure were made with government support under Contract No. FA8650-19-D-2063. The government may have certain rights.

FIELD OF THE DISCLOSURE

The present disclosure relates generally to gas turbine engines, and more specifically to distortion mitigation in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

In embedded gas turbine engine applications, the engine may experience high distortion in the form of pressure gradients and swirl. The pressure and swirl distortions may cause engine stall or other undesirable aeromechanical behavior. The fan of the gas turbine engine may include mitigation systems to reduce pressure and swirl distortions.

SUMMARY

The present disclosure may comprise one or more of the following features and combinations thereof.

An aircraft may include a duct system, a gas turbine engine, and an inlet distortion mitigation system. The duct system may be configured to receive a flow of air therethrough. The gas turbine engine may be in downstream fluid communication with a main duct included in the duct system. The inlet distortion mitigation system may be located in the duct system to increase flow distribution uniformity at a primary fan included in the gas turbine engine.

In some embodiments, the duct system may include a main duct, a first inlet duct in fluid communication with the main duct, and a second inlet duct in fluid communication with the main duct. The first inlet duct and the second inlet duct may each be arranged fluidly upstream of the main duct so as to conduct the flow of air from the first inlet duct and the second inlet duct into the main duct.

In some embodiments, the gas turbine engine may include a primary fan, a compressor, a combustor, and a turbine. The primary fan may be configured push air to provide thrust for the gas turbine engine. The compressor may be configured to rotate about an axis of the gas turbine engine to compress at least a portion of the air that flows from the primary fan. The combustor may be configured to receive the compressed air from the compressor. The turbine may be coupled to the compressor and may be configured to rotate about the axis of the gas turbine engine in response to receiving hot, high-pressure products of the combustor to drive the compressor.

In some embodiments, the inlet distortion mitigation system may include a plurality of auxiliary inlet fans having a first electric inlet fan arranged in the first inlet duct, a second electric inlet fan arranged in the second inlet duct, and a control unit. The control unit may be configured to vary individually a rotation speed of each of the first electric inlet fan and the second electric inlet fan in response to a pressure differential in the flow path of the gas turbine engine to increase flow distribution uniformity at the primary fan of the gas turbine engine.

In some embodiments, the plurality of auxiliary inlet fans may include a third electric inlet fan and a fourth electric inlet fan. The third electric inlet fan may be arranged in the first inlet duct downstream of the first electric inlet fan. The fourth electric inlet fan may be arranged in the second inlet duct downstream of the first electric inlet fan.

In some embodiments, the first and second electric inlet fans may each be configured to rotate in a first direction about a corresponding fan axis. The third and fourth electric inlet fans may each be configured to rotate in a second direction opposite the first direction about a corresponding fan axis. In some embodiments, the first and second, third, and fourth electric inlet fans may each be configured to rotate in a first direction about a corresponding fan axis.

In some embodiments, the inlet distortion mitigation system may further include an auxiliary fan array. The auxiliary fan array may be located radially between the main duct of the duct system and the primary fan. The auxiliary fan array may be located axially in line with the primary fan relative to the axis of the gas turbine engine.

In some embodiments, the auxiliary fan array may include a plurality of auxiliary fans. The plurality of auxiliary fans may be spaced apart around the axis of the gas turbine engine. Each auxiliary fan may be configured to rotate about a corresponding fan axis that is parallel to the axis of the gas turbine engine.

In some embodiments, the first and second electric inlet fans may each include a rotor and a plurality of variable pitch fan blades. The rotor may be configured to rotate about the corresponding fan axis. The plurality of variable pitch fan blades may be coupled to the rotor. Each of the variable pitch fan blades may extend radially outward away from the rotor relative to the corresponding fan axis. Each of the variable pitch fan blades may be configured to rotate about a blade axis that extends radially from the corresponding fan axis.

In some embodiments, the inlet distortion mitigation system may further include an auxiliary fan array located radially between the main duct of the duct system and the primary fan and located axially in line with the primary fan relative to the axis of the gas turbine engine. The auxiliary fan array may include a plurality of auxiliary fans spaced apart around the axis of the gas turbine engine. Each auxiliary fan may be configured to rotate about a corresponding fan axis that is parallel to the axis of the gas turbine engine.

In some embodiments, the plurality of auxiliary fans included in the auxiliary fan array may include a first set of electric fans having a first diameter, a second set of electric fans having the first diameter, a third set of electric fans having a second diameter, and a fourth set of electric fans having the second diameter. The second set of electric fans may be spaced apart circumferentially from the first set of electric fans. The third set of electric fans may be located circumferentially between the first set of electric fans and the second set of electric fans. The fourth set of electric fans may be located circumferentially between the first set of electric fans and the second set of electric fans. The second diameter may be greater than the first diameter. The fourth set of electric fans may be spaced apart circumferentially from the third set of electric fans.

In some embodiments, the first set of electric fans and the second set of electric fans may each have a rotor, blades, and a nacelle. The third set of electric fans and the fourth set of electric fans may each have a rotor, blades, and a nacelle. The nacelles of the first set of electric fans and the second set of electric fans may have a first axial length and the nacelles of the third set of electric fans and the fourth set of electric fans may have a second axial length greater than the first axial length.

In some embodiments, the control unit may further include a memory coupled to the controller. The memory may include a plurality of preprogrammed aircraft maneuvers that each correspond to a predetermined speed profile for the auxiliary fan array.

In some embodiments, the controller may be configured to detect a preprogrammed aircraft maneuver included in the plurality of preprogrammed aircraft maneuvers on the memory. The controller may be configured to vary a rotation speed of at least one of the first electric inlet fan and the second electric inlet fan in response to detecting the preprogrammed aircraft maneuver.

In some embodiments, the control unit may further include a plurality of sensors arranged to measure pressure within the flow path of the gas turbine engine upstream of the engine core. The controller may be coupled to the plurality of sensors to receive pressure measurements from the plurality of sensors.

In some embodiments, the controller may be configured to increase the rotation speed of at least one of the first electric inlet fan and the second electric inlet fan in response to the pressure measurement being below a predetermined threshold. In some embodiments, the controller may be configured to decrease the rotation speed of at least one of the first electric inlet fan and the second electric inlet fan in response to the pressure measurement being above the predetermined threshold.

According to another aspect of the present disclosure, an aircraft may include a duct system, a gas turbine engine, and an inlet distortion mitigation system. The duct system may include a main duct, a first inlet duct in fluid communication with the main duct, and a second inlet duct in fluid communication with the main duct. The first inlet duct and the second inlet duct may each be arranged fluidly upstream of the main duct.

In some embodiments, the gas turbine engine may be in downstream fluid communication with the main duct. The gas turbine engine may include a primary fan. The primary fan may be configured push air to provide thrust for the gas turbine engine.

In some embodiments, the inlet distortion mitigation system may include a plurality of auxiliary inlet fans. The plurality of auxiliary inlet fans may have a first electric inlet fan arranged in the first inlet duct, a second electric inlet fan arranged in the second inlet duct, and a control unit. The control unit may be configured to vary individually a rotation speed of each of the first electric inlet fan and the second electric inlet fan in response to a pressure differential in the flow path of the gas turbine engine.

In some embodiments, the plurality of auxiliary inlet fans may include a third electric inlet fan and a fourth electric inlet fan. The third electric inlet fan may be arranged in the first inlet duct downstream of the first electric inlet fan. The fourth electric inlet fan may be arranged in the second inlet duct downstream of the first electric inlet fan.

In some embodiments, the first and second electric inlet fans may each be configured to rotate in a first direction about a corresponding fan axis. The third and fourth electric inlet fans may each be configured to rotate in a second direction opposite the first direction about a corresponding fan axis.

In some embodiments, the third and fourth electric inlet fans may each include a rotor configured to rotate about the corresponding fan axis and a plurality of variable pitch fan blades coupled to the rotor. Each of the variable pitch fan blades may extend radially outward away from the rotor relative to the corresponding fan axis. Each of the variable pitch fan blades may be configured to rotate about a blade axis that extends radially from the corresponding fan axis.

In some embodiments, the inlet distortion mitigation system may further include an auxiliary fan array located radially between the main duct of the duct system and the primary fan and located axially in line with the primary fan relative to the axis of the gas turbine engine. The auxiliary fan array may include a plurality of auxiliary fans spaced apart around the axis of the gas turbine engine. Each of the auxiliary fan may be configured to rotate about a corresponding fan axis that is parallel to the axis of the gas turbine engine.

In some embodiments, the plurality of auxiliary fans included in the auxiliary fan array may include a first set of electric fans having a first diameter, a second set of electric fans having the first diameter and spaced apart circumferentially from the first set of electric fans, a third set of electric fans having a second diameter and located circumferentially between the first set of electric fans and the second set of electric fans, and a fourth set of electric fans having the second diameter and located circumferentially between the first set of electric fans and the second set of electric fans. The second diameter may be greater than the first diameter. The fourth set of electric fans may be spaced apart circumferentially from the third set of electric fans.

In some embodiments, the first set of electric fans and the second set of electric fans may each have a rotor, blades, and a nacelle. The third set of electric fans and the fourth set of electric fans may each have a rotor, blades, and a nacelle. The nacelles of the first set of electric fans and the second set of electric fans may have a first axial length and the nacelles of the third set of electric fans and the fourth set of electric fans may have a second axial length greater than the first axial length.

In some embodiments, the control unit may further include a memory coupled to the controller. The memory may include a plurality of preprogrammed aircraft maneuvers that each correspond to a predetermined speed profile for the auxiliary fan array. The controller may be configured to detect a preprogrammed aircraft maneuver included in the plurality of preprogrammed aircraft maneuvers on the memory and vary a rotation speed of at least one of the first electric inlet fan and the second electric inlet fan in response to detecting the preprogrammed aircraft maneuver.

In some embodiments, the control unit may further include a plurality of sensors arranged to measure pressure within the flow path of the gas turbine engine upstream of the engine core. The controller may be coupled to the plurality of sensors to receive pressure measurements from the plurality of sensors. The controller may be configured to increase the rotation speed of at least one of the first electric inlet fan and the second electric inlet fan in response to the pressure measurement being below a predetermined threshold. The controller may be configured to decrease the rotation speed of at least one of the first electric inlet fan and the second electric inlet fan in response to the pressure measurement being above the predetermined threshold.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
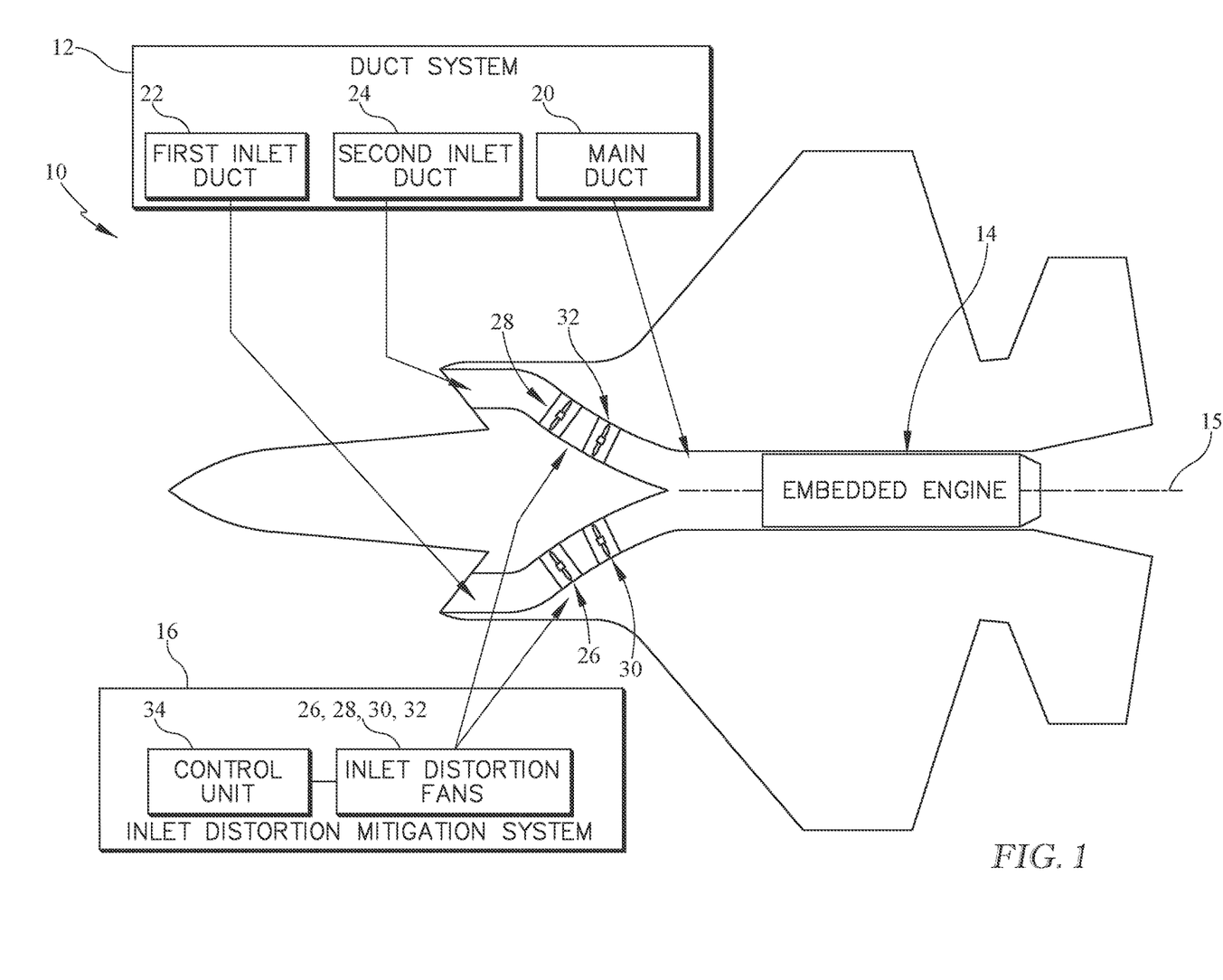
FIG. 1 is a diagrammatic view of an aircraft that includes a duct system having a main duct and inlet ducts arranged fluidly upstream of the main duct so as to conduct a flow of air from the inlet ducts into the main duct, a gas turbine engine in downstream fluid communication with the main duct, and an inlet distortion mitigation system that includes a plurality of auxiliary inlet fans having electric inlet fans arranged in each of the inlet ducts and a control unit configured to vary individually a rotation speed of each electric inlet fan in response to a pressure differential in the flow path of the gas turbine engine upstream of the engine core to increase flow distribution uniformity at a primary fan of the gas turbine engine.
Figure 2:
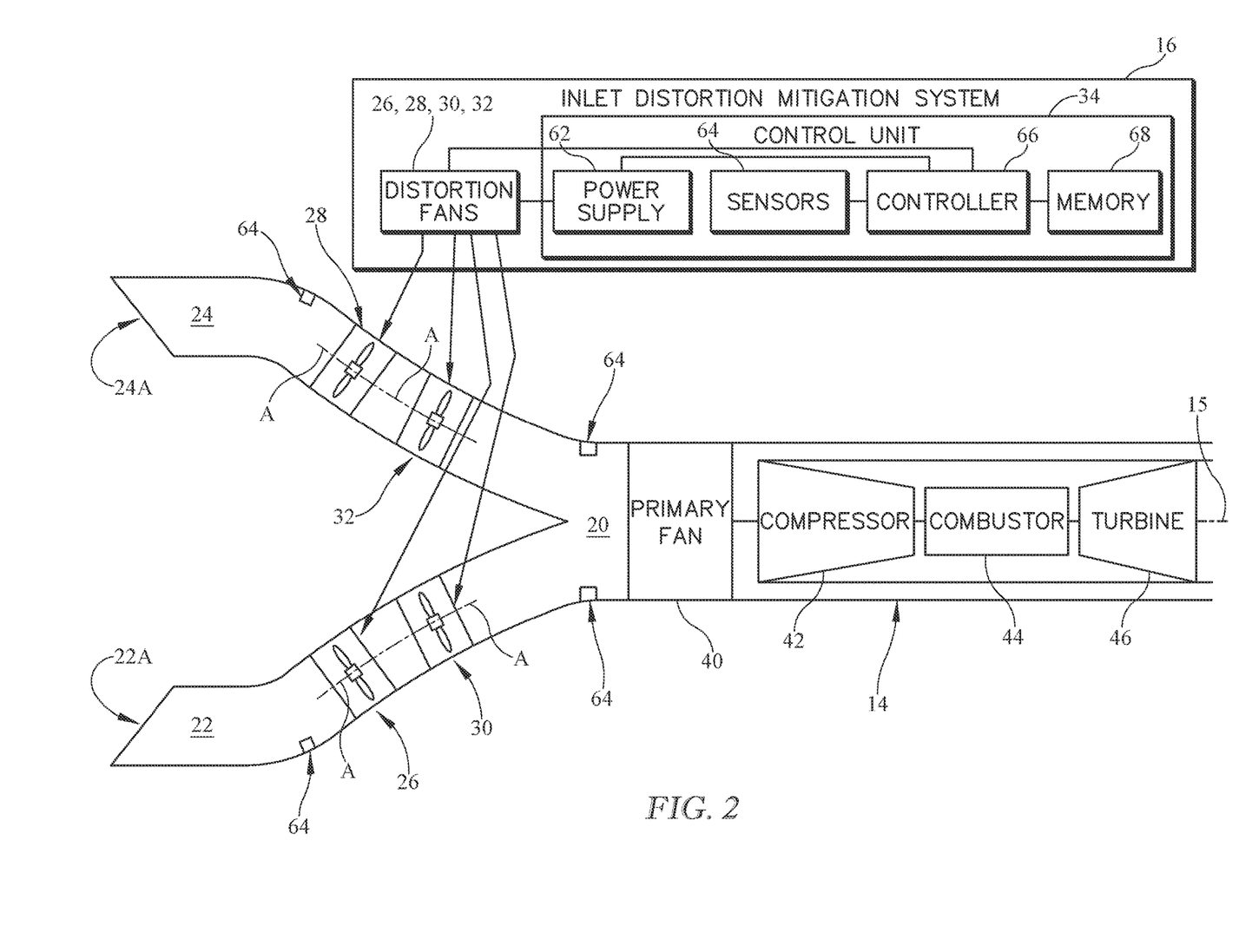
FIG. 2 is a detailed diagrammatic view of the aircraft of FIG. 1 showing the gas turbine engine includes the primary fan configured push air to provide thrust for the gas turbine engine, a compressor configured to rotate about an axis of the gas turbine engine to compress at least a portion of the air that flows from the primary fan, a combustor configured to receive the compressed air from the compressor, and a turbine coupled to the compressor and configured to rotate about the axis of the gas turbine engine in response to receiving hot, high-pressure products of the combustor to drive the compressor

An illustrative aircraft 10 includes a duct system 12, a gas turbine engine 14, and an inlet distortion mitigation system 16 as shown in FIGS. 1 and 2. The duct system 12 is configured to receive a flow of air therethrough. The duct 12 includes a main duct 20 and inlet ducts 22, 24 arranged fluidly upstream of the main duct 20 so as to conduct the flow of air from the inlet ducts 22, 24 into the main duct 20. The gas turbine engine 14 is in downstream fluid communication with the main duct 20. The inlet distortion mitigation system 16 includes a plurality of auxiliary inlet fans 26, 28, 30, 32 arranged in the inlet ducts 22, 24 and configured to increase flow distribution uniformity at a primary fan 40 of the gas turbine engine 14.

The inlet distortion mitigation system 16 includes the plurality of auxiliary inlet fans 26, 28, 30, 32 and a control unit 34 as shown in FIGS. 1 and 2. The control unit 34 is configured to vary individually a rotation speed of each electric inlet fan 26, 28, 30, 32 in response to a pressure differential in a flow path of the gas turbine engine 14. At a least a portion of the flow path of the gas turbine engine 14 is defined by the duct system 12. Locating the auxiliary inlet fans 26, 28, 30, 32 in the inlet ducts 22, 24 allows for differential flows and pressures to be mitigated between the different inlets 22, 24 and help bring a more uniform distribution to the face of the primary fan 40. In the illustrative embodiment, two ducts 22, 24 are provided and each duct 22, 24 includes a pair of auxiliary inlet fans 26, 30 and 28, 32. In other embodiments, any number of ducts may be provided and feed into the main duct 20 and each duct may include any number of auxiliary inlet fans.

Embedded engines on an aircraft may include multiple inlets, which transport air flow to a turbofan engine. In such configurations, when the aircraft experiences side slip, one portion of the primary fan of the engine experiences high flow while the other experiences low flow along with associated differential pressures as suggested in FIGS. 3 and 4. This may cause stall or aeromechanical issues in the engine if not mitigated or it may force the engine to impose keep-out zones or restrictions in its operating limitations.

Therefore, the aircraft 10 of the present disclosure includes the inlet distortion mitigation system 16 having the plurality of auxiliary inlet fans 26, 28, 30, 32 in the inlet ducts 22, 24 to allow for differential flows and pressures to be mitigated. This allows the primary fan 40 to adapt to or endure distortion patterns better than embodiments with a single fan. The inlet distortion mitigation system 16 may replace active technologies, such as recirculation or similar tip injection or may be used in addition to such active technologies. The plurality of auxiliary inlet fans 26, 28, 30, 32 may also aid the primary fan 40 in normal operation with uniform speed and direction during flat and level cruise, with the plurality of auxiliary inlet fans 26, 28, 30, 32 serving as a booster. Then during different aircraft maneuvers, the plurality of auxiliary inlet fans 26, 28, 30, 32 may return to or operate in a distortion mitigation regime.

The plurality of auxiliary inlet fans 26, 28, 30, 32 included in the inlet distortion mitigation system 16 has a first electric inlet fan 26, a second electric inlet fan 28, a third electric inlet fan 30, and a fourth electric inlet fan 32 as shown in FIGS. 1 and 2. The first electric inlet fan 26 is arranged in the first inlet duct 22 axially aft of an inlet opening 22A of the first inlet duct 22, and the second electric inlet fan 28 is arranged in the second inlet duct 24 axially aft of the inlet opening 24A of the second inlet duct 24. The third electric inlet fan 30 is arranged in the first inlet duct 22 downstream of the first electric inlet fan 26, while the fourth electric inlet fan 32 is arranged in the second inlet duct 24 downstream of the second electric inlet fan 28.

In the illustrative embodiment, the inlet distortion mitigation system 16 includes pairs of electric inlet fans 26, 28, 30, 32 in each inlet duct 22, 24. In other embodiments, only one electric inlet fan 26, 28, 30, 32 may be arranged in each inlet duct 22, 24. For example, the first inlet duct 22 may only have the first inlet fan 26 arranged therein and the second inlet duct 24 may only have the second inlet fan 28 arranged therein.

In the illustrative embodiment, the first and second electric inlet fans 26, 28 are each configured to rotate in a first direction about a corresponding fan axis A. The third and fourth electric inlet fans 30, 32 are each configured to rotate in a second direction about a corresponding fan axis A. The second direction is opposite the first direction such that the auxiliary inlet fans 26, 28, 30, 32 in each inlet duct 22, 24 are contra-rotating.

In the illustrative embodiment, the first direction is clockwise rotation and the second direction is counterclockwise rotation. In some embodiments, the auxiliary inlet fans 26, 28, 30, 32 in each inlet duct 22, 24 may rotate in the same direction.

Figure 3:
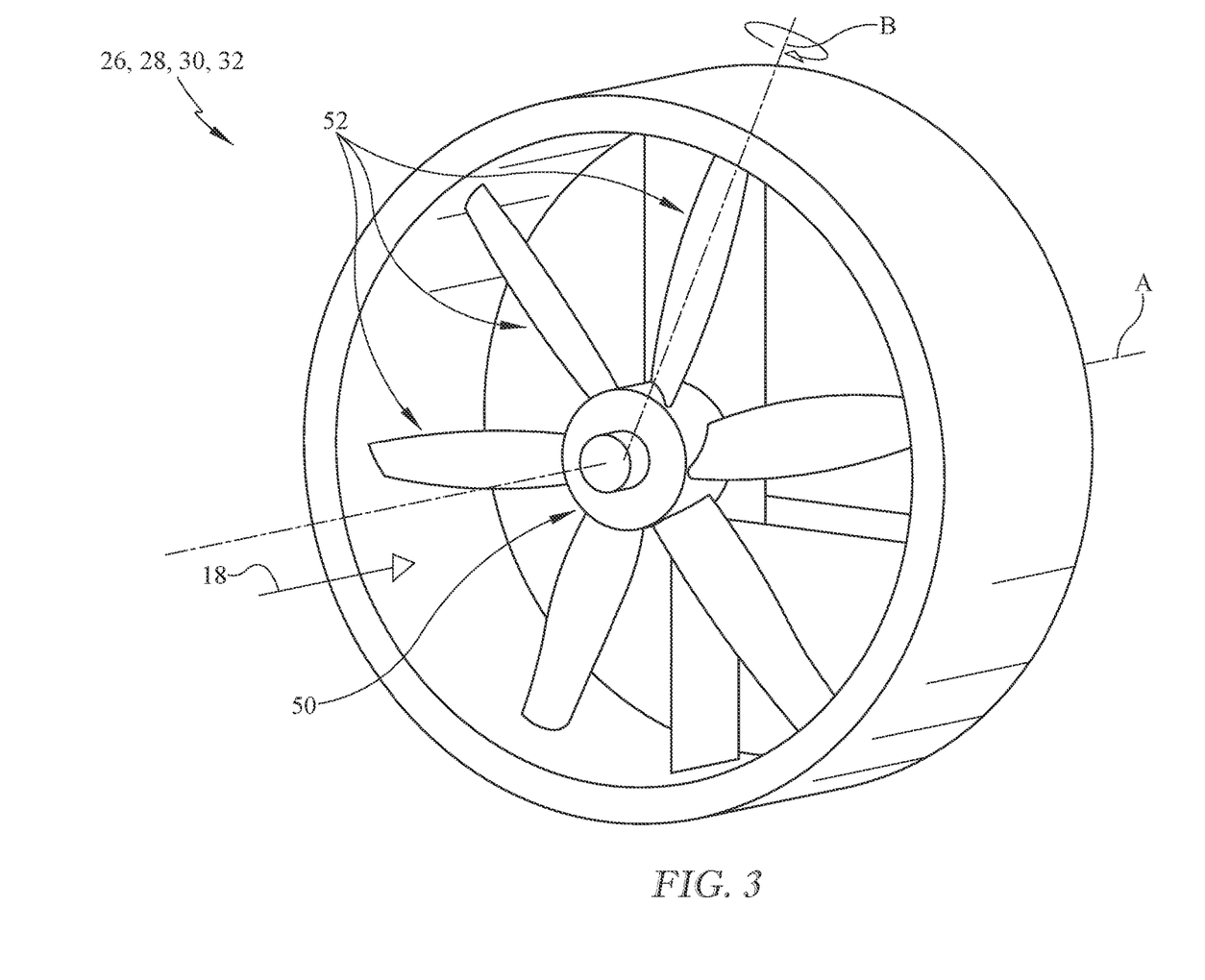
FIG. 3 is perspective view of one of the electric inlet fans included in the plurality of auxiliary inlet fans showing the inlet fan includes a rotor configured to rotate about a corresponding fan axis and a plurality of fan blades coupled to the rotor that extend radially outward away from the rotor relative to the corresponding fan axis.

Each of the electric inlet fans 26, 28, 30, 32 includes a rotor 50 and a plurality of fan blades 52 as shown in FIG. 3. The rotor 50 is configured to rotate about the corresponding fan axis A. The fan blades 52 are coupled to the rotor 50 and extend radially outward away from the rotor 50 relative to the corresponding fan axis A. In some embodiments, the fan blades 52 are variable pitch fan blades 52 configured to rotate about a blade axis B that extends radially from the corresponding fan axis A. In the illustrative embodiment, the third and fourth electric inlet fans 30, 32 are variable pitch fans that include variable pitch fan blades 52.

The control unit 34 includes a power supply 62, sensors 64, a controller 66 including a processor, and a memory 68 as shown in FIG. 3. The power supply 62 is coupled to each of the auxiliary inlet fans 26, 28, 30, 32 to provide power to each of the auxiliary inlet fans 26, 28, 30, 32. The plurality of sensors 64 arranged to measure pressure within the flow path of the gas turbine engine 14 upstream of the engine core 13. The controller 66 is coupled to each of the auxiliary inlet fans 26, 28, 30, 32 and the power supply 62. The controller 66 is also coupled to the plurality of sensors 64 to receive pressure measurements from the plurality of sensors 64. The memory 68 is coupled to the controller 66 and has a plurality of preprogrammed aircraft maneuvers that each correspond to a predetermined speed profile for the auxiliary fan array 22.

Based on the pressure measurements and/or the detected preprogrammed aircraft maneuvers, the controller 66 is configured to individually increase, decrease, and/or maintain the speed of each of the auxiliary inlet fans 26, 28, 30, 32. The controller 66 is configured to increase the rotation speed of the auxiliary inlet fan or fans 26, 28, 30, 32 included in the inlet distortion mitigation system 16 in response to the pressure measurement from the sensors 64 being below a predetermined threshold. The controller 66 is configured to decrease the rotation speed of the auxiliary inlet fan or fans 26, 28, 30, 32 included in the inlet distortion mitigation system 16 in response to the pressure measurement being above the predetermined threshold.

In other words, when the pressure in one of the inlet ducts 22, 24 is below the predetermined threshold, the controller 66 is configured to increase the rotation speed of the auxiliary inlet fan or fans 26, 28, 30, 32 located in the corresponding inlet duct 22, 24. Similarly, when the pressure in one of the inlet ducts 22, 24 is above the predetermined threshold, the controller 66 is configured to decrease the rotation speed of the auxiliary inlet fan or fans 26, 28, 30, 32 located in the corresponding inlet duct 22, 24.

The controller 66 may also be configured to maintain the rotation speed of the auxiliary inlet fan or fans 26, 28, 30, 32 included in the inlet distortion mitigation system 16 if the pressure measurements are within the predetermined threshold. Alternatively, the controller 66 may be configured to stop rotation of at least one auxiliary inlet fan 26, 28, 30, 32 included in the inlet distortion mitigation system 16 if the pressure measurements are within the predetermined threshold.

For example, if the pressure in the first inlet duct 22 is below the predetermined threshold, the controller 66 increases the speed of one or both of the auxiliary inlet fans 26, 30 in the first inlet duct 22. Simultaneously, the controller 66 may increase, decrease, or maintain the rotation speed of the auxiliary inlet fans 28, 32 in the second inlet duct 24 depending on the pressure in the second inlet duct 24. Therefore, if the pressure in the first inlet duct 22 is below the predetermined threshold and the pressure in the second inlet duct 24 is above the predetermined threshold, the controller 66 increases the speed of one or both of the auxiliary inlet fans 26, 30 in the first inlet duct 22 and decreases the speed of one or both of the auxiliary inlet fans 28, 32 in the second inlet duct 24.

Conversely, if the pressure in the first inlet duct 22 is above the predetermined threshold, the controller 66 decreases the speed of one or both of the auxiliary inlet fans 26, 30 in the first inlet duct 22. Simultaneously, the controller 66 may increase, decrease, or maintain the rotation speed of the auxiliary inlet fans 28, 32 in the second inlet duct 24 depending on the pressure in the second inlet duct 24. Therefore, if the pressure in the first inlet duct 22 is above the predetermined threshold and the pressure in the second inlet duct 24 is below the predetermined threshold, the controller 66 decreases the speed of one or both of the auxiliary inlet fans 26, 30 in the first inlet duct 22 and increases the speed of one or both of the auxiliary inlet fans 28, 32 in the second inlet duct 24.

Additionally, the controller 66 is configured to increase, decrease, or maintain the rotation speed of each auxiliary inlet fan 26, 28, 30, 32 independently. For example, if the pressure in the first inlet duct 22 is below the predetermined threshold, the controller 66 may increase the speed of the first inlet fan 26 to a first speed while increasing or maintaining the rotation speed of the third inlet fan 30 to a second speed that is different from the first speed. Conversely, if the pressure in the first inlet duct 22 is below the predetermined threshold, the controller 66 may increase the speed of the third inlet fan 30 to a first speed while increasing or maintaining the rotation speed of the first inlet fan 26 to a second speed that is different from the first speed.

If the pressure in the first inlet duct 22 is above the predetermined threshold, the controller 66 may decrease the speed of the first inlet fan 26 to a third speed while decreasing or maintaining the rotation speed of the third inlet fan 30 to a fourth speed that is different from the third speed. Conversely, if the pressure in the first inlet duct 22 is above the predetermined threshold, the controller 66 may decrease the speed of the third inlet fan 30 to a third speed while decreasing or maintaining the rotation speed of the first inlet fan 26 to a fourth speed that is different from the third speed.

Simultaneously, the controller 66 may vary or maintain the speed of the auxiliary inlet fans 28, 32 in the second inlet duct 24. For example, if the pressure in the second inlet duct 24 is below the predetermined threshold, the controller 66 may increase the speed of the second inlet fan 28 to a fifth speed while increasing or maintaining the rotation speed of the fourth inlet fan 32 to a sixth speed that is different from the fifth speed. Conversely, if the pressure in the second inlet duct 24 is below the predetermined threshold, the controller 66 may increase the speed of the fourth inlet fan 32 to a fifth speed while increasing or maintaining the rotation speed of the second inlet fan 28 to a sixth speed that is different from the fifth speed.

If the pressure in the second inlet duct 24 is above the predetermined threshold, the controller 66 may decrease the speed of the second inlet fan 28 to a seventh speed while decreasing or maintaining the rotation speed of the fourth inlet fan 32 to an eighth speed that is different from the seventh speed. Conversely, if the pressure in the second inlet duct 24 is above the predetermined threshold, the controller 66 may decrease the speed of the fourth inlet fan 32 to a seventh speed while decreasing or maintaining the rotation speed of the second inlet fan 28 to an eighth speed that is different from the seventh speed.

The controller 66 is also configured to maintain demanded thrust for the engine 14. Therefore, the controller 66 is configured to vary the rotation speed of the auxiliary inlet fan or fans 26, 28, 30, 32 to adjust the pressure while still meeting the overall thrust needed for the engine 14. Therefore, mitigation speeds may be relative to the overall distribution of pressure.

The controller 66 is also configured to vary the rotation speed of the auxiliary inlet fan or fans 26, 28, 30, 32 to overcome natural swirl created by the inlet passage 22, 24 (including at particular maneuvers). The swirl may be measured with a five hole probe or sensors in the inlet ducts 22, 24 and the controller 66 may vary the rotation speed of the auxiliary inlet fan or fans 26, 28, 30, 32 based on the swirl measurements from the sensors and/or prior experience or testing using pre-programmed logic based on maneuvers. The fan 26, 28, 30, 32 in the direction of the swirl may be directed to slow and the fan 26, 28, 30, 32 rotating in the opposite direction may increase in rotation speed to reduce swirl intensity.

Based on the direction of the swirl in the inlet duct 22, 24, the controller 66 may vary the rotation speed of the inlet fans 26, 28, 30, 32. For example, if the swirl is detected in the first inlet duct 22, the controller 66 may decrease the rotation speed of the inlet fan 26, 30 rotating in the direction of the swirl and increase the rotation speed of the other inlet fan 26, 30 rotating in the opposite direction.

Simultaneously, the controller 66 may vary or maintain the speed of the auxiliary inlet fans 28, 32 in the second inlet duct 24 based on the swirl and/or pressure measurements in the second inlet duct 24. For example, if the swirl is detected in the second inlet duct 24, the controller 66 may decrease the rotation speed of the inlet fan 28, 32 rotating in the direction of the swirl and increase the rotation speed of the other inlet fan 28, 32 rotating in the opposite direction.

Additionally, the controller 66 may be configured to direct the variable pitch fan blades 52 of the fans 30, 32 to adjust position based on the pressure measurements from the sensors 64 and/or the detected preprogrammed aircraft maneuver. The controller 66 may direct the fan blades 52 to change the blade angles based on the pressure measurements from the sensors 64 and/or the detected preprogrammed aircraft maneuver.

The controller 66 is also configured to detect a preprogrammed aircraft maneuver included in the plurality of preprogrammed aircraft maneuvers on the memory 68. The controller 66 is configured to direct the fans 26, 28, 30, 32 to individually increase, decrease, and/or maintain the speed in response to detecting the preprogrammed aircraft maneuver.

For instance, some maneuvers, i.e. banks, turns, rolls, etc., may cause more air to be pulled into through one inlet 22, 24 compared to the other inlet 22, 24. Based on the maneuver, the pressure gradient at the fan face of the gas turbine engine 14 may be predicted such that the rotation speed of the fans 26, 28, 30, 32 can be altered preemptively to minimize the distortions. Based on the detected maneuver, the controller 66 is configured to increase and/or decrease the speed of the fans 26, 28, 30, 32 to help maintain good flow through the maneuvers.

The speed of each fan 26, 28, 30, 32 creates the predetermined speed profile that corresponds to the aircraft maneuver so that whenever the controller 66 detects the preprogrammed aircraft maneuver, the controller 66 directs the inlet distortion mitigation system 16 to the corresponding predetermined speed profile to counter the predicted pressure distortions that will result from the aircraft maneuver and help bring a more uniform distribution to the face of the primary fan 40. Based on the speed profile, the rotation speed of each of the auxiliary inlet fans 26, 28, 30, 32 may be adjusted independently by the controller 66 like as discussed above.

In some embodiments, the position of the variable pitch fan blades 52 of the fans 30, 32 may be a part of the predetermined speed profile. Therefore, the speed and position of each fan 26, 28, 30, 32 creates the predetermined speed profile that corresponds to the aircraft maneuver so that whenever the controller 66 detects the preprogrammed aircraft maneuver, the controller 66 directs the inlet distortion mitigation system 16 to the corresponding predetermined speed profile to counter the predicted pressure distortions that will result from the aircraft maneuver and help bring a more uniform distribution to the face of the primary fan 40.

In some embodiments, other sensors on the aircraft may detect different orientations of the aircraft that correspond to one of the preprogrammed aircraft maneuvers and provide the information to the controller 66. The controller 66 is configured to direct the inlet distortion mitigation system 16 to change to the corresponding predetermined speed profile in response to the other sensor detecting the preprogrammed aircraft maneuver. In the illustrative embodiment, the controller 66 may be configured to use a combination of the pressure measurements and the detected preprogrammed aircraft maneuver to control the rotation speeds of each of the auxiliary inlet fans 26, 28, 30, 32.

Turning again to the aircraft 10 includes the duct system 12, the gas turbine engine 14, and the inlet distortion mitigation system 16 as shown in FIGS. 1 and 2. The duct system 12 includes the main duct 20, a first inlet duct 22 in fluid communication with the main duct 20, and a second inlet duct 24 in fluid communication with the main duct 20.

The first inlet duct 22 and the second inlet duct 24 are each arranged fluidly upstream of the main duct 20 so as to conduct the flow of air from the first inlet duct 22 and the second inlet duct 24 into the main duct 20.

In other embodiments, the duct system 12 may include more than two inlet ducts 22, 24. In some embodiments, the duct system 12 may include three inlet ducts. In other embodiments, the duct system 12 may include four inlet ducts. No matter the number of inlet ducts 22, 24, the inlet ducts are each arranged fluidly upstream of the main duct 20 so as to conduct the flow of air from inlet ducts into the main duct 20.

The gas turbine engine 14 includes the primary fan 40, a compressor 42, a combustor 44, and a turbine 46 as shown in FIG. 2. The compressor 42 compresses and delivers air to the combustor 44. The combustor 44 mixes fuel with the compressed air received from the compressor 42 and ignites the fuel. The hot, high-pressure products of the combustion reaction in the combustor 44 are directed into the turbine 46 to cause the turbine 46 to rotate about the axis 15 of the gas turbine engine 14 and drive the compressor 42 and the primary fan 40. The primary fan 40 is driven by the turbine 46 and provides thrust for propelling the aircraft 10.

Figure 4:
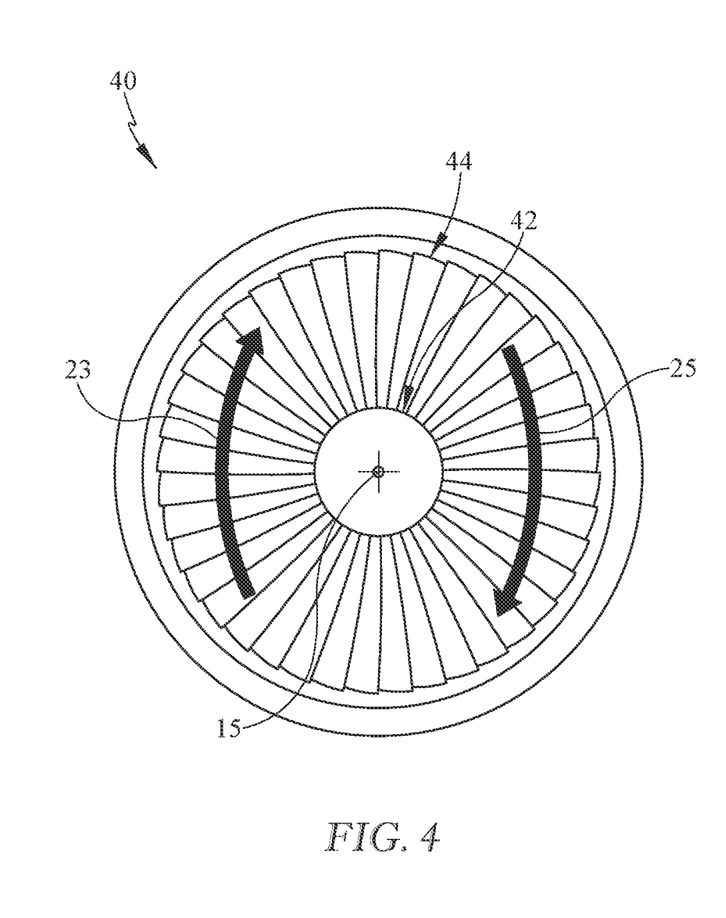
FIG. 4 is a diagrammatic view of the primary fan included in the aircraft of FIG. 2 showing the different inlet flows from each inlet duct of the duct system at the fan face.
Figure 5:
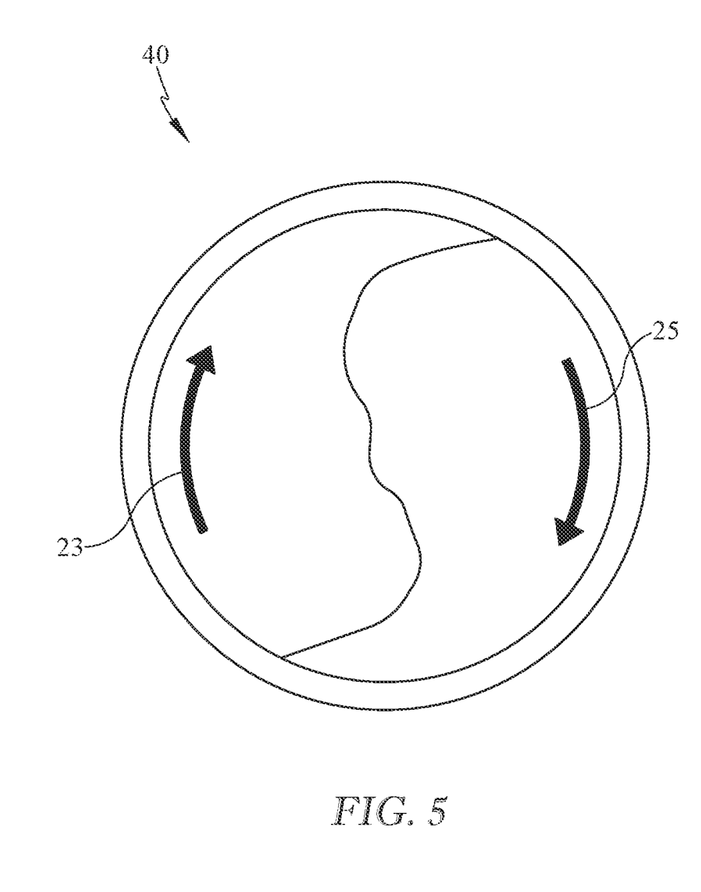
FIG. 5 is view similar to FIG. 4 suggesting diagrammatically how the inlet flows are funneled into sectors of the primary fan so as to distribute the inlet flows around the circumference of the fan.

The primary fan 40 includes a fan rotor 42 and a plurality of fan blades 44 as shown in FIG. 4. The plurality of fan blades 44 each extend radially outward from the fan rotor 42. The flow of air 23, 25 from each inlet duct 22, 24 is funneled into sectors of the primary fan 40 so as to distribute the inlet flows 23, 25 around the circumference of the primary fan 40 as shown in FIGS. 4 and 5.

The inlet distortion mitigation system 16 includes the plurality of auxiliary inlet fans 26, 28, 30, 32 and the control unit 34 as shown in FIGS. 1 and 2. The control unit 34 is configured to vary individually a rotation speed of each electric inlet fan 26, 28, 30, 32 in response to a pressure differential in a flow path of the gas turbine engine 14. Locating the auxiliary inlet fans 26, 28, 30, 32 in the inlet ducts 22, 24 allows for differential flows and pressures to be mitigated between the different inlets 22, 24 and help bring a more uniform distribution to the face of the primary fan 40.

The control unit 34 includes the power supply 62, the sensors 64, the controller 66 including a processor, and the memory 68 as shown in FIG. 3. The power supply 62 is coupled to each of the auxiliary inlet fans 26, 28, 30, 32 to provide power to each of the auxiliary inlet fans 26, 28, 30, 32. The plurality of sensors 64 arranged to measure pressure within the flow path of the gas turbine engine 14 upstream of the engine core 13. The controller 66 is coupled to each of the auxiliary inlet fans 26, 28, 30, 32 and the power supply 62. The controller 66 is also coupled to the plurality of sensors 64 to receive pressure measurements from the plurality of sensors 64. The memory 68 is coupled to the controller 66 and has the plurality of preprogrammed aircraft maneuvers that each correspond to a predetermined speed profile for the auxiliary fan array 22.

The power supply 30 may include a generator and batteries (not shown). In some embodiments, the generator may embedded in the gas turbine engine 14. The generator may be coupled to the gas turbine engine 14 to produce electricity during use of the engine 14 in the illustrative embodiment. The generator may be coupled to the plurality of auxiliary inlet fans 26, 28, 30, 32 to supply power to the plurality of auxiliary inlet fans 26, 28, 30, 32 to drive rotation of the plurality of auxiliary inlet fans 26, 28, 30, 32. The batteries may be coupled to the generator to store electricity produced by the generator. The batteries may be coupled to the auxiliary inlet fans 26, 28, 30, 32 to supply power to the auxiliary inlet fans 26, 28, 30, 32.

In some embodiments, the batteries may supplement the power supplied by the generator to the auxiliary inlet fans 26, 28, 30, 32. The batteries may supply power to the auxiliary inlet fans 26, 28, 30, 32 during takeoff of the aircraft and/or during cruise conditions.

Figure 6:
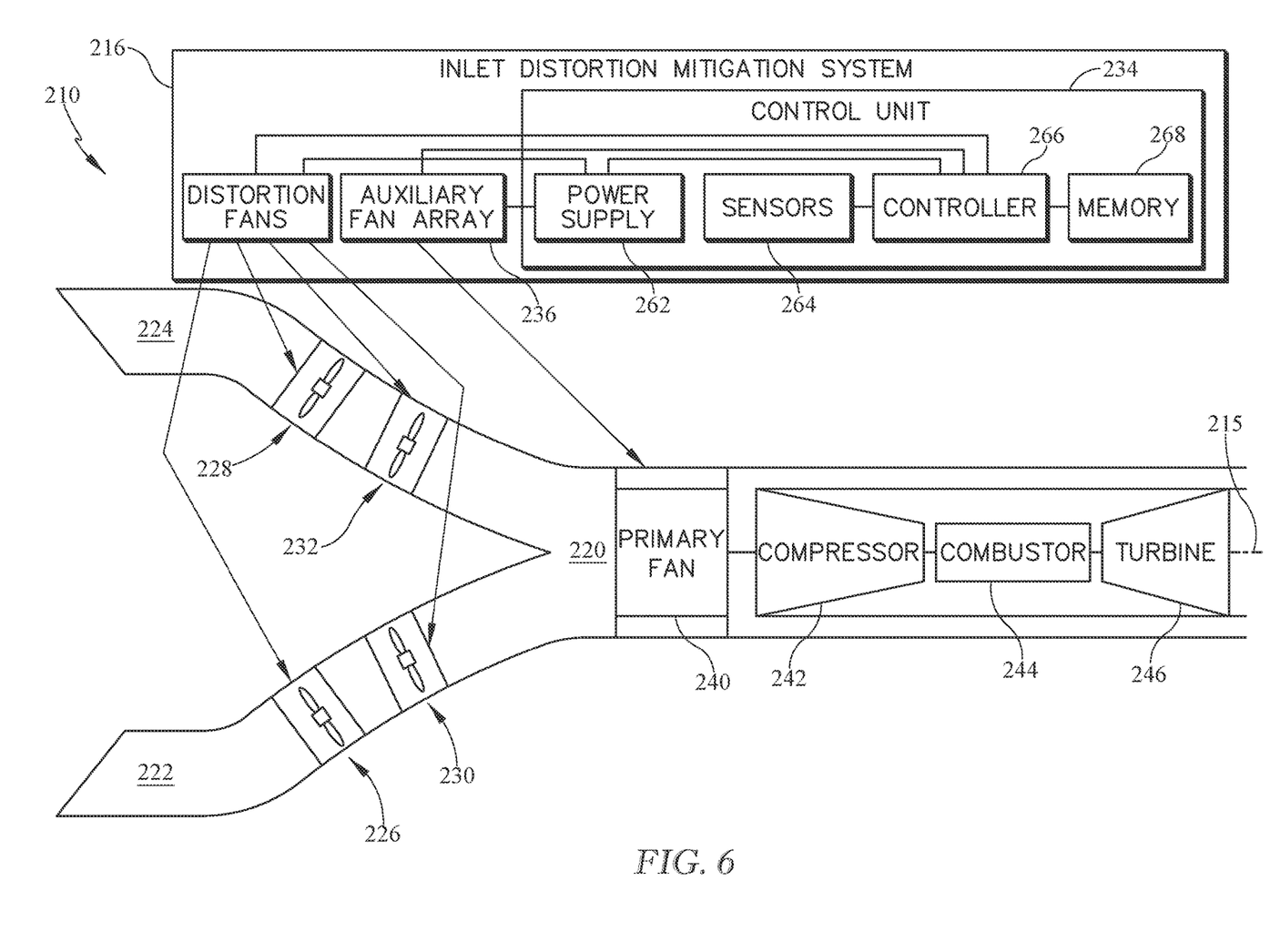
FIG. 6 is another embodiment of an inlet distortion mitigation system for the aircraft of FIG. 1 showing that, in addition to the auxiliary inlet fans arranged in the inlet ducts, the inlet distortion mitigation system includes an auxiliary fan array located radially between the main duct of the duct system and the primary fan and located axially in line with the primary fan relative to the axis of the gas turbine engine.
Figure 7:
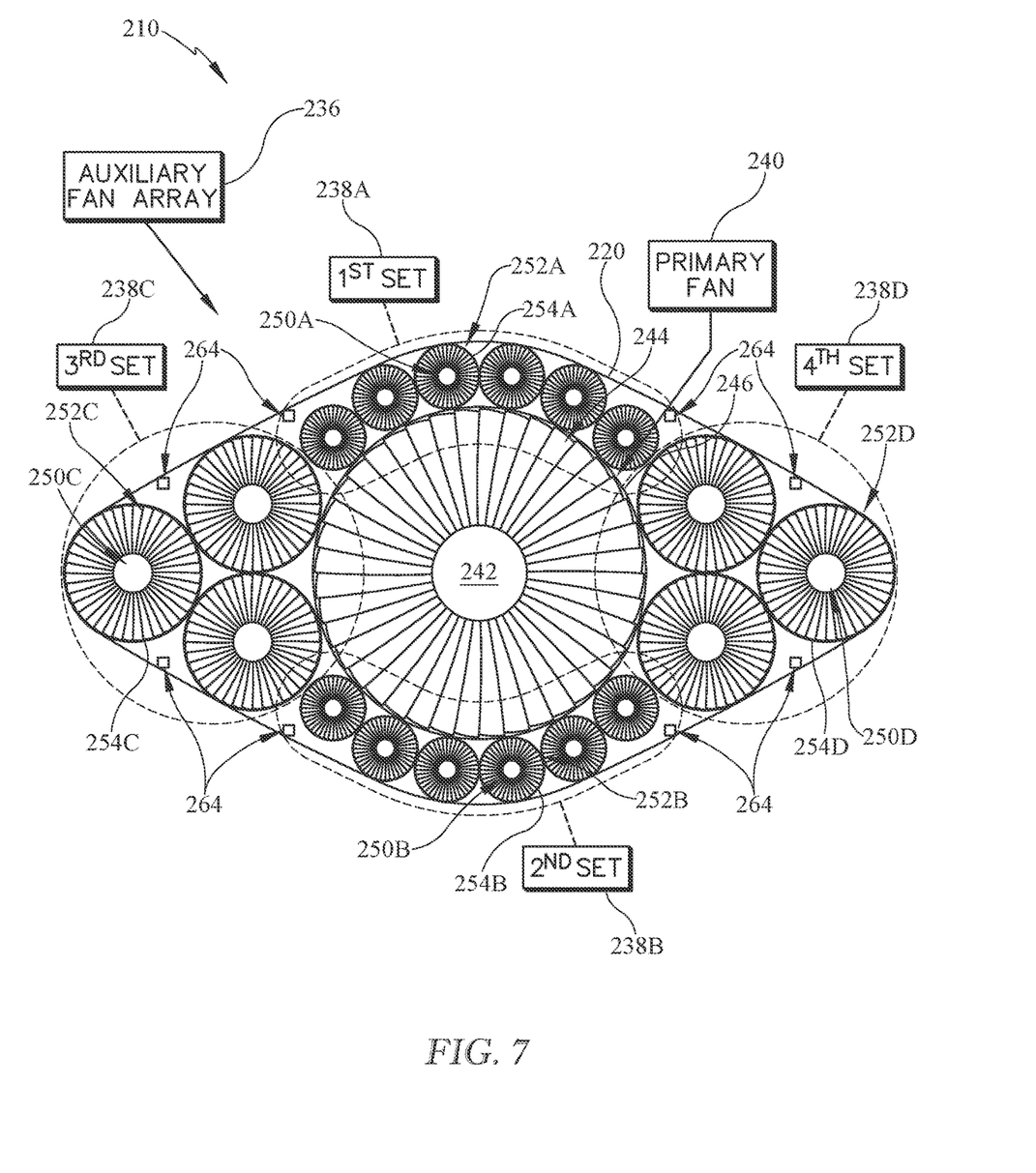
FIG. 7 is a perspective and diagrammatic view of the auxiliary fan array included in the inlet distortion mitigation system of FIG. 6 showing the auxiliary fan array includes a first set of electric fans having a first diameter, a second set of electric fans having the first diameter, a third set of electric fans having a second diameter greater than the first diameter, and a fourth set of electric fans having the second diameter that arranged circumferentially around the primary fan of the gas turbine engine.
Figure 8:
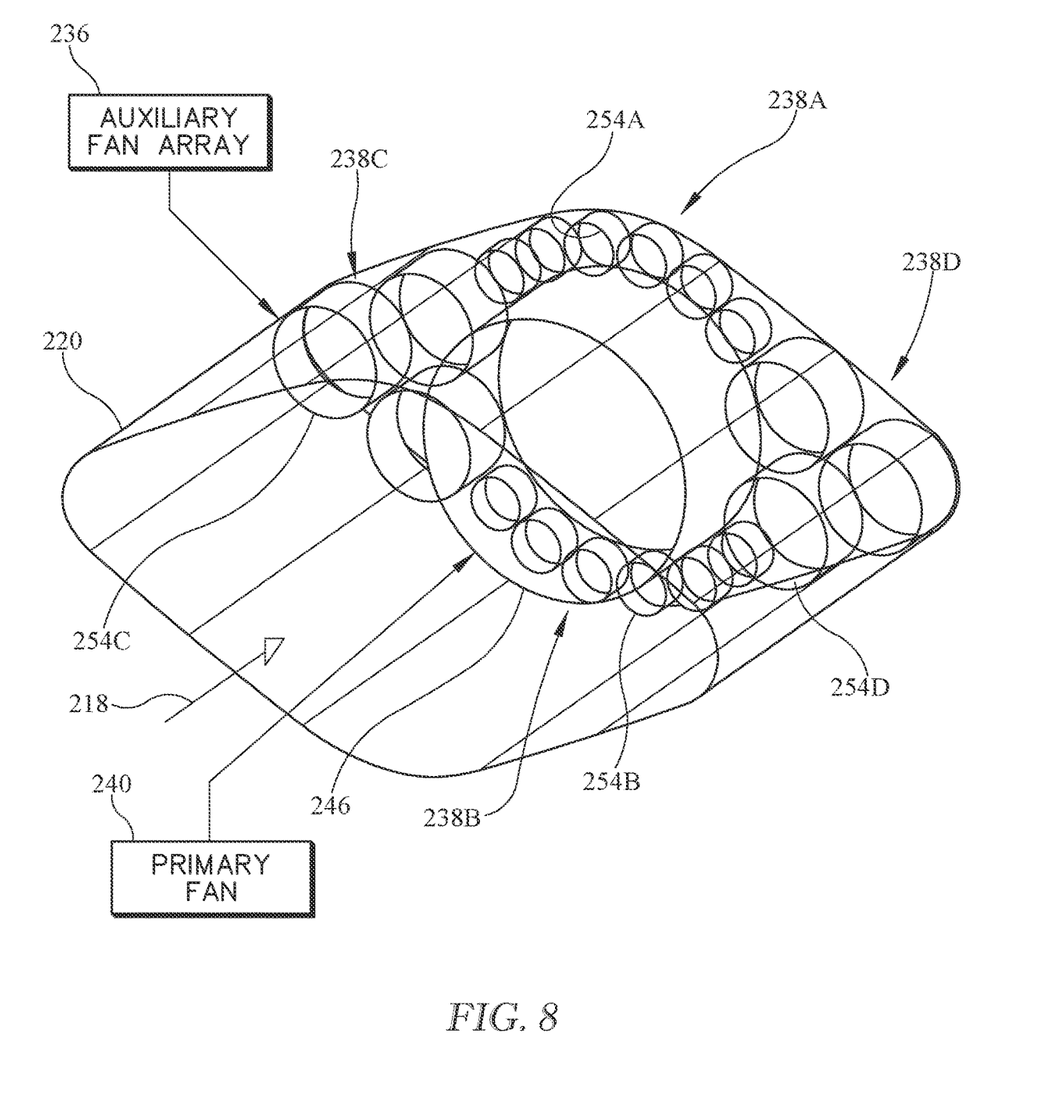
FIG. 8 is a perspective and diagrammatic view of the auxiliary fan array of FIG. 7.

Another embodiment of an inlet distortion mitigation system 216 in accordance with the present disclosure is shown in FIGS. 6-8. The inlet distortion mitigation system 216 is substantially similar to the inlet distortion mitigation system 16 shown in FIGS. 1-5 and described herein. Accordingly, similar reference numbers in the 200 series indicate features that are common between the inlet distortion mitigation system 16 and the inlet distortion mitigation system 216. The description of the inlet distortion mitigation system 16 is incorporated by reference to apply to the inlet distortion mitigation system 16, except in instances when it conflicts with the specific description and the drawings of the inlet distortion mitigation system 216.

The inlet distortion mitigation system 216 includes the plurality of auxiliary inlet fans 226, 228, 230, 232, an auxiliary fan array 236, and a control unit 34 as shown in FIG. 6. Each of the auxiliary inlet fans 226, 228, 230, 232 are arranged in the inlet ducts 222, 224 of the duct system 212. The auxiliary fan array 236 is located radially between the main duct 220 of the duct system 212 and the primary fan 240. The auxiliary fan array 236 is located axially in line with the primary fan 240 relative to the axis 215 of the gas turbine engine 214. The control unit 234 is configured to vary individually a rotation speed of each electric inlet fan 226, 228, 230, 232 as well as the plurality of auxiliary fans 238A, 238B, 238C, 238D included in the auxiliary fan array 236 in response to a pressure differential in a flow path of the gas turbine engine 214.

Locating the auxiliary inlet fans 226, 228, 230, 232 in the inlet ducts 222, 224 allows for differential flows and pressures to be mitigated between the different inlets 222, 224 and help bring a more uniform distribution to the face of the primary fan 240. The auxiliary fan array 236 arranged around the primary fan 240 work with the auxiliary inlet fans 226, 228, 230, 232 in the inlet ducts 222, 224 to help mitigate the pressure distortions.

The auxiliary fan array 236 includes the plurality of auxiliary fans 238A, 238B, 238C, 238D as shown in FIGS. 7 and 8. The plurality of auxiliary fans 238A, 238B, 238C, 238D are spaced apart around the axis 215 of the gas turbine engine 214. Each of the plurality of auxiliary fans 238A, 238B, 238C, 238D are configured to rotate about a corresponding fan axis that is parallel to the axis 215 of the gas turbine engine 214.

The plurality of electric fans 238A, 238B, 238C, 238D include a first set of electric fans 238A, a second set of electric fans 238B, a third set of electric fans 238C, and a fourth set of electric fans 238D as shown in FIGS. 7 and 8. The second set of electric fans 238B are spaced apart circumferentially from the first set of electric fans 238A. The third set of electric fans 238C and the fourth set of electric fans 238D are located circumferentially between the first set of electric fans 238A and the second set of electric fans 238B on opposite sides of the primary fan 12. The fourth set of electric fans 238D is spaced apart circumferentially from the third set of electric fans 238C.

The first and second sets of electric fans 238A, 238B have a first diameter, while the third and fourth sets of electric fans 238C, 238D have a second diameter as shown in FIGS. 7 and 8. The second diameter is greater than the first diameter in the illustrative embodiment. By using different sized electric fans 238A, 238B, 238C, 238D in the auxiliary fan array 236, gaps between the inner fan case 46 and the outer case 44. In some embodiments, the outer case 44 may be a duct.

In the illustrative embodiment, each set of electric fans 238A, 238B, 238C, 238D has a rotor 250A, 250B, 250C, 250D, blades 252A, 252B, 252C, 252D, and a nacelle 254A, 254B, 254C, 254D as shown in FIGS. 7 and 8. The nacelles 254A, 254B of the first set of electric fans 238A and the second set of electric fans 238B have a first axial length, while the nacelles 254C, 254D of the third set of electric fans 238C and the fourth set of electric fans 238D have a second axial length as shown in FIG. 8. The second axial length is greater than the first axial length in the illustrative embodiment.

The rotation speed of the electric fans 238A, 238B, 238C, 238D may be controlled independently from the auxiliary inlet fans 226, 228, 230, 232. In the illustrative embodiment, the controller 266 is configured to increase the rotation speed of the electric fans 238A, 238B, 238C, 238D included in the auxiliary fan array 236 at or near the area of the flow path where the pressure measurement from the sensors 264 is below a predetermined threshold. Similarly, the controller 266 is configured to decrease the rotation speed of the electric fans 238A, 238B, 238C, 238D included in the auxiliary fan array 236 at or near the area of the flow path where the pressure measurement from the sensors 264 is above a predetermined threshold.

For instance, the controller 266 may direct the electric fans 238A, 238B, 238C, 238D at one location around the circumference of the engine 214 to increase rotation speed, while also directing other electric fans 238A, 238B, 238C, 238D included in the auxiliary fan array 236 at another location to decrease in rotation speed. Whether the speed of each of the electric fans 238A, 238B, 238C, 238D is increased, decreased, and/or maintained depends on the pressure gradient in the flow path of the engine 214. In areas of high pressure, the rotation speed of the electric fans 238A, 238B, 238C, 238D is increased. In areas of low pressure, the rotation speed of the electric fans 238A, 238B, 238C, 238D is decreased. In areas where the pressure is within the desired threshold, the speed of the electric fans 238A, 238B, 238C, 238D may be maintained.

The inlet distortion mitigation system 216 is included in an aircraft 210 in the illustrative embodiment. The aircraft 210 further includes the duct system 212 and the gas turbine engine 214 as shown in FIG. 6. The duct system 212 is configured to receive a flow of air therethrough. The duct 212 includes the main duct 220 and inlet ducts 222, 224 arranged fluidly upstream of the main duct 220 so as to conduct the flow of air from the inlet ducts 222, 224 into the main duct 220. The gas turbine engine 214 is in downstream fluid communication with the main duct 220. The inlet distortion mitigation system 16 includes a plurality of auxiliary inlet fans 226, 228, 230, 232 arranged in the inlet ducts 222, 224. The auxiliary fans 238A, 238B, 238C, 238D are located in the main duct 220 around the primary fan 240.

The gas turbine engine 214 includes the primary fan 240, a compressor 242, a combustor 244, and a turbine 246 as shown in FIG. 6. The compressor 242 compresses and delivers air to the combustor 244. The primary fan 240 includes a fan rotor 256, a plurality of fan blades 258, and a fan case 260 as shown in FIG. 7. The plurality of fan blades 258 each extend radially outward from the fan rotor 256. The fan case 260 extends circumferentially around the axis 215 of the gas turbine engine 214 radially outward of the fan blades 258 to define a portion of the flow path of the gas turbine engine 214.

The main duct 220 around the gas turbine engine 214 to create a bypass duct therebetween as shown in FIG. 6. The engine core, i.e. the compressor 242, the combustor 244, and the turbine 246, is arranged radially inward to create the bypass duct.

Embedded applications may involve multiple inlets, which transport air flow to a turbofan. As technology progresses, the potential for an increased number of smaller inlets spread across an aircraft and/or simpler bifurcated inlets may be possible. These duct systems may deliver inequivalent quality air flows with various distortions from different inlets, particularly during maneuvers such as significant side slip or angle of attack.

As a result, one portion of the fan experiences high flow while the other experiences low flow along with associated differential pressures like as suggested in FIGS. 4 and 5. If not mitigated, this may cause stall or aeromechanical issues or may force the engine to impose keep-out zones or restrictions. Therefore, a means to offset or overcome such distortions may be beneficial to the advancement of airframe and engine capabilities.

In other embodiments, there may be methods to modify distortion for embedded engines with conventional serpentine ducts with flow control by microjets or plasma generators or with vanelets. Additionally, in other embodiments, there may be methods for improving fan capability to handle distortion, such as mistuning, improved damping, casing treatments, tip injection, or mechanical design of the fan tailored for distortion.

However, typical flow control may not overcome a configuration with differing duct flows from multiple sources, and neither likely would the fan handle this effectively without limiting its performance or creating keep out zones in the envelope. Therefore, the aircraft 10, 210 includes an inlet distortion mitigation system 16, 216 having auxiliary inlet fans 26, 28, 30, 32, 226, 228, 230, 232 in the inlet passages 22, 24, 222, 224 to allow for differential flows and pressures to be mitigated between the different inlets 22, 24, 222, 224 and bring more uniform distribution to the fan face. These fans may be 26, 28, 30, 32, 226, 228, 230, 232 near the end of the passages or ducts 22, 24, 222, 224 or close to/in typical engine manufacturer's regime.

The inlet fans 26, 28, 30, 32, 226, 228, 230, 232 in the inlet passages 22, 24, 222, 224 ahead of a turbofan may help make the flows from different sources more uniform. By individually varying the fan speed, the fans, 28, 30, 32, 226, 228, 230, 232 may help offset the distortion being experienced. By using this to overcome the challenges of multiple inlets, the aircraft may be more robust to angle of attack or side slip.

In the illustrative embodiments, the duct system 12, 212 includes two inlet ducts 22, 24, 222, 224. In some embodiments, there may be one inlet duct 22, 24, 222, 224 on each lateral side of the aircraft 10, 210 feeding to the primary fan 40, 240 with distributed fans 26, 28, 30, 32, 226, 228, 230, 232 helping to direct the flows more uniformly.

In other embodiments, the duct system 12, 212 may include three inlets with two on the each side and one on top. In other embodiments, the duct system 12, 212 may include four or more inlets (such as two vertically offset on each side). These flows may be comingled together and directed in a co-swirling direction to feed into the fan 40, 240 with the least chances of negative aerodynamic or aeromechanical negative outcomes.

In some embodiments, the inlet distortion mitigation system 16, 216 may allow for different and smaller inlets for the primary fan. These inlets may be low or near the flying wing's leading edge and work more effectively during upward angle of attack and others be on the upper surface and be more effective on downward angle of attack. Alternatively, there may be different inlets on port versus starboard side, which may work more effectively for side slip, one drawing in more direct flows while the other would have less flow and more swirl being created. For example, the inlet distortion mitigation system 16, 216 may allow the duct system 12, 212 to include a primary inlet duct at the center or top of the aircraft 10 and two side ducts for high angles of side slip.

A conventional fan may be negatively affected with passages coming in from different surfaces of the plane with different pressures and/or swirl. However, with the inlet distortion mitigation system 16, 216 having individually controlled speed fans 26, 28, 30, 320, 226, 228, 230, 232 in the passages 22, 24, 222, 224 or at the fan face, such inlet configuration may be possible. The inlet distortion mitigation system 16, 216 may enable different inlet streams to be brought together to feed the fan 40, 240 and core 14, 214 and may help maintain good flow in maneuvers (some openings would pull in more air while others would have less, instead of just one large one being affected).

In the illustrative embodiment, the auxiliary inlet fans 26, 28, 30, 32, 226, 228, 230, 232 may also be configure to create a co-swirl or neutral state at the fan face to help mitigate counter-swirl distortion creation. The inlet distortion mitigation system 16, 216 may allow for greater aircraft maneuverability without restrictions on the flight envelope compared to other aircraft configurations. The inlet distortion mitigation system 16, 216 allows for optimization of response not present with a single fan being embedded.

The inlet distortion mitigation system 16, 216 may improve survivability by replacing a single large inlet with multiple smaller ones. Alternatively, the aerodynamic interface plane (AIP) between the airframe and the engine may be modified to suit these multiple passages from the intake.

The inlet distortion mitigation system 16, 216 also allows the primary fan 40, 240 to adapt to or endure in distortion patterns better than a single fan otherwise could. The inlet distortion mitigation system 16, 216 may also allow the primary fan 40, 240 to adapt to or endure in distortion patterns even better than some active technologies, such as recirculation or similar tip injection schemes.

The distributed fans 26, 28, 30, 32, 226, 228, 230, 232 may also aid the primary fan 40 in normal operation with uniform speed and direction during flat and level cruise (with them serving as a booster), but then come into a distortion mitigation regime during maneuvers. If there were more than two inlet ducts, then differentials in distributed inlet passage fans may also help mitigate angle of attack issues or ground effects. As fans 26, 28, 30, 32, 226, 228, 230, 232 included in the inlet distortion mitigation system 16, 216 use electric motors, the fans 26, 28, 30, 32, 226, 228, 230, 232 may be set at different speeds and may be able to respond quickly, which provides the opportunity for aeromechanical issue mitigation via disruption of modes.

In some embodiments, the inlet distortion mitigation system 16, 216 may have a series of two more fans 26, 28, 30, 32, 226, 228, 230, 232 in each inlet duct 22, 24, 222, 224. The second fan 30, 32, 230, 232 may de-swirl the first 26, 28, 226, 228 in some embodiments. In other embodiments, a differential of the two fans 26, 28, 30, 32, 226, 228, 230, 232 may overcome natural swirl created by the inlet passage 22, 24, 222, 2224 (including at particular maneuvers). Alternatively, a single fan 26, 28, 30, 32, 226, 228, 230, 232 with variable pitch blades may work in a similar manner to vary direction or windmill varying as needed. The mitigation may be determined by prior measurements and calibrated response to maneuvers, or with active measurement, or a combination of both.

In some embodiments, the fans 26, 28, 30, 32, 226, 228, 230, 232 may include two contra rotating fans in the inlet ducts 22, 24, 222, 224 to reduce swirl going into the fan 40, 240. Alternatively, the inlet mitigation system 16, 216 may include vanes forward or aft of the fans 26, 28, 30, 32, 226, 228, 230, 232 to straighten the flow. Varying the speeds between the series of fans 26, 28, 30, 32, 226, 228, 230, 232 in the passage 22, 24, 222, 224 may leave co or counter flowing vortices as preferred by the fan's aeromechanical strengths and capability in different situations, such as particular maneuvers or engine speeds.

Coordination between the airframe and fan design may select the number of inlets to optimize for the fan's aeromechanical strengths, such as going with 3-off inlets if the fan was robust to 3EO forcing (such as not having a crossing in the operating range of interest or having very low response to such). It may also be ideal to use higher prime numbers such as 5-off inlets, 7-off inlets, or even 11-off smaller inlets to average a smoother flow around the circumference and avoid forcing. One of many inlets may also be split and these be sent to non-adjacent fan sectors to create 7-off flow introductions with only 3-inlets for example by having a pair split into 2 each and one split into 3. This gives great flexibility for the turbofan to be robust to new airframe designs which may have multiple inlets per engine (as simple a bifurcated or as complex as multiple inlets on a stealthier application). The AIP definition may need to adapt to the configuration, such that the transfer of ownership to the engine is moved forward and includes the passages.

The flow mitigation auxiliary fans may be dynamic and controlled by sensors and/or control logic, so as to adjust to different conditions or in anticipation of maneuvers/inputs/programming. This may allow the turbofan to potentially be simpler (less tailoring of it to distortion or without technologies such as tip injection or mistuning) with support of the distributed fans 26, 28, 30, 32, 226, 228, 230, 232 in the passages 22, 24, 222, 224 to aid in overcoming distortion. In other embodiments, the additional distributed fans 226, 228, 230, 232 surrounding the primary fan 240 could work with the auxiliary fans 238A, 238B, 238C, 238D to pump flows in the passages from the inlets 222, 224. The arrangements of fans 238A, 238B, 238C, 238D may take the shape of the airframe rather than enforcing a large cylinder within the body, such as a wide diamond shape as shown in FIG. 7. Overall, the configuration may enable more survivable designs that handle more extreme maneuvers and enhance the capability to mitigate or preferably treat inlet distortion before it reaches the embedded turbofan.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An aircraft comprising
   a duct system configured to receive a flow of air therethrough, the duct system including a main duct, a first inlet duct in fluid communication with the main duct, and a second inlet duct in fluid communication with the main duct, the first inlet duct and the second inlet duct each being arranged fluidly upstream of the main duct so as to conduct the flow of air from the first inlet duct and the second inlet duct into the main duct, a gas turbine engine in downstream fluid communication with the main duct, the gas turbine engine including a primary fan configured push air to provide thrust for the gas turbine engine, a compressor configured to rotate about an axis of the gas turbine engine to compress at least a portion of the air that flows from the primary fan, a combustor configured to receive the compressed air from the compressor, and a turbine coupled to the compressor and configured to rotate about the axis of the gas turbine engine in response to receiving hot, high-pressure products of the combustor to drive the compressor, and an inlet distortion mitigation system including a plurality of auxiliary inlet fans having a first electric inlet fan arranged in the first inlet duct, a second electric inlet fan arranged in the second inlet duct, and a control unit configured to vary individually a rotation speed of each of the first electric inlet fan and the second electric inlet fan in response to a pressure differential in the flow path of the gas turbine engine to increase flow distribution uniformity at the primary fan of the gas turbine engine.

2. The aircraft of claim 1, wherein the plurality of auxiliary inlet fans includes a third electric inlet fan arranged in the first inlet duct downstream of the first electric inlet fan and a fourth electric inlet fan arranged in the second inlet duct downstream of the first electric inlet fan.

3. The aircraft of claim 2, wherein the first and second electric inlet fans are each configured to rotate in a first direction about a corresponding fan axis and the third and fourth electric inlet fans are each configured to rotate in a second direction opposite the first direction about a corresponding fan axis.

4. The aircraft of claim 2, wherein the first and second, third, and fourth electric inlet fans are each configured to rotate in a first direction about a corresponding fan axis.

5. The aircraft of claim 2, wherein the inlet distortion mitigation system further includes an auxiliary fan array located radially between the main duct of the duct system and the primary fan and located axially in line with the primary fan relative to the axis of the gas turbine engine, the auxiliary fan array including a plurality of auxiliary fans spaced apart around the axis of the gas turbine engine that are each configured to rotate about a corresponding fan axis that is parallel to the axis of the gas turbine engine.

6. The aircraft of claim 1, wherein the first and second electric inlet fans each includes a rotor configured to rotate about the corresponding fan axis and a plurality of variable pitch fan blades coupled to the rotor that extend radially outward away from the rotor relative to the corresponding fan axis, each of the variable pitch fan blades configured to rotate about a blade axis that extends radially from the corresponding fan axis.

7. The aircraft of claim 1, wherein the inlet distortion mitigation system further includes an auxiliary fan array located radially between the main duct of the duct system and the primary fan and located axially in line with the primary fan relative to the axis of the gas turbine engine, the auxiliary fan array including a plurality of auxiliary fans spaced apart around the axis of the gas turbine engine that are each configured to rotate about a corresponding fan axis that is parallel to the axis of the gas turbine engine.

8. The aircraft of claim 7, wherein the plurality of auxiliary fans included in the auxiliary fan array include a first set of electric fans having a first diameter, a second set of electric fans having the first diameter and spaced apart circumferentially from the first set of electric fans, a third set of electric fans having a second diameter and located circumferentially between the first set of electric fans and the second set of electric fans, and a fourth set of electric fans having the second diameter and located circumferentially between the first set of electric fans and the second set of electric fans, the second diameter being greater than the first diameter, and the fourth set of electric fans being spaced apart circumferentially from the third set of electric fans.

9. The aircraft of claim 8, wherein the first set of electric fans and the second set of electric fans each have a rotor, blades, and a nacelle, the third set of electric fans and the fourth set of electric fans each have a rotor, blades, and a nacelle, the nacelles of the first set of electric fans and the second set of electric fans have a first axial length, and nacelles of the third set of electric fans and the fourth set of electric fans have a second axial length greater than the first axial length.

10. The aircraft of claim 1, wherein the control unit further includes a memory coupled to the controller, the memory including a plurality of preprogrammed aircraft maneuvers that each correspond to a predetermined speed profile for the auxiliary fan array, and the controller is configured to detect a preprogrammed aircraft maneuver included in the plurality of preprogrammed aircraft maneuvers on the memory and vary a rotation speed of at least one of the first electric inlet fan and the second electric inlet fan in response to detecting the preprogrammed aircraft maneuver.

11. The aircraft of claim 10, wherein the control unit further includes a plurality of sensors arranged to measure pressure within the flow path of the gas turbine engine upstream of the engine core, the controller is coupled to the plurality of sensors to receive pressure measurements from the plurality of sensors, and the controller is configured to increase the rotation speed of at least one of the first electric inlet fan and the second electric inlet fan in response to the pressure measurement being below a predetermined threshold.

12. The aircraft of claim 10, wherein the controller is configured to decrease the rotation speed of at least one of the first electric inlet fan and the second electric inlet fan in response to the pressure measurement being above the predetermined threshold.

13. An aircraft comprising
a duct system including a main duct, a first inlet duct in fluid communication with the main duct, and a second inlet duct in fluid communication with the main duct, the first inlet duct and the second inlet duct each being arranged fluidly upstream of the main duct, a gas turbine engine in downstream fluid communication with the main duct, the gas turbine engine including a primary fan configured push air to provide thrust for the gas turbine engine, and an inlet distortion mitigation system including a plurality of auxiliary inlet fans having a first electric inlet fan arranged in the first inlet duct, a second electric inlet fan arranged in the second inlet duct, and a control unit configured to vary individually a rotation speed of each of the first electric inlet fan and the second electric inlet fan in response to a pressure differential in the flow path of the gas turbine engine.

14. The aircraft of claim 13, wherein the plurality of auxiliary inlet fans includes a third electric inlet fan arranged in the first inlet duct downstream of the first electric inlet fan and a fourth electric inlet fan arranged in the second inlet duct downstream of the first electric inlet fan.

15. The aircraft of claim 14, wherein the first and second electric inlet fans are each configured to rotate in a first direction about a corresponding fan axis and the third and fourth electric inlet fans are each configured to rotate in a second direction opposite the first direction about a corresponding fan axis.

16. The aircraft of claim 14, wherein the third and fourth electric inlet fans each includes a rotor configured to rotate about the corresponding fan axis and a plurality of variable pitch fan blades coupled to the rotor that extend radially outward away from the rotor relative to the corresponding fan axis, each of the variable pitch fan blades configured to rotate about a blade axis that extends radially from the corresponding fan axis.

17. The aircraft of claim 13, wherein the inlet distortion mitigation system further includes an auxiliary fan array located radially between the main duct of the duct system and the primary fan and located axially in line with the primary fan relative to the axis of the gas turbine engine, the auxiliary fan array including a plurality of auxiliary fans spaced apart around the axis of the gas turbine engine that are each configured to rotate about a corresponding fan axis that is parallel to the axis of the gas turbine engine, and wherein the plurality of auxiliary fans included in the auxiliary fan array include a first set of electric fans having a first diameter, a second set of electric fans having the first diameter and spaced apart circumferentially from the first set of electric fans, a third set of electric fans having a second diameter and located circumferentially between the first set of electric fans and the second set of electric fans, and a fourth set of electric fans having the second diameter and located circumferentially between the first set of electric fans and the second set of electric fans, the second diameter being greater than the first diameter, and the fourth set of electric fans being spaced apart circumferentially from the third set of electric fans.

18. The aircraft of claim 17, wherein the first set of electric fans and the second set of electric fans each have a rotor, blades, and a nacelle, the third set of electric fans and the fourth set of electric fans each have a rotor, blades, and a nacelle, the nacelles of the first set of electric fans and the second set of electric fans have a first axial length, and nacelles of the third set of electric fans and the fourth set of electric fans have a second axial length greater than the first axial length.

19. The aircraft of claim 13, wherein the control unit further includes a memory coupled to the controller, the memory including a plurality of preprogrammed aircraft maneuvers that each correspond to a predetermined speed profile for the auxiliary fan array, and the controller is configured to detect a preprogrammed aircraft maneuver included in the plurality of preprogrammed aircraft maneuvers on the memory and vary a rotation speed of at least one of the first electric inlet fan and the second electric inlet fan in response to detecting the preprogrammed aircraft maneuver.

20. The aircraft of claim 13, wherein the control unit further includes a plurality of sensors arranged to measure pressure within the flow path of the gas turbine engine upstream of the engine core, the controller is coupled to the plurality of sensors to receive pressure measurements from the plurality of sensors, and the controller is configured to increase the rotation speed of at least one of the first electric inlet fan and the second electric inlet fan in response to the pressure measurement being below a predetermined threshold and configured to decrease the rotation speed of at least one of the first electric inlet fan and the second electric inlet fan in response to the pressure measurement being above the predetermined threshold.

* * * * *